United States Patent
Smithson

(10) Patent No.: US 8,453,723 B2
(45) Date of Patent: Jun. 4, 2013

(54) CONTROL OF WELL TOOLS UTILIZING DOWNHOLE PUMPS

(75) Inventor: Mitchell C. Smithson, Pasadena, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 253 days.

(21) Appl. No.: 12/792,402

(22) Filed: Jun. 2, 2010

(65) Prior Publication Data

US 2010/0236790 A1 Sep. 23, 2010

Related U.S. Application Data

(63) Continuation-in-part of application No. PCT/US2008/075668, filed on Sep. 9, 2008.

(51) Int. Cl.
*E21B 29/02* (2006.01)

(52) U.S. Cl.
USPC ...... 166/65.1; 166/66.6; 166/373; 340/853.7; 340/854.9

(58) Field of Classification Search
USPC ............... 166/373, 66.6, 65.1; 340/853.7, 340/854.9
See application file for complete search history.

(56) References Cited

U.S. PATENT DOCUMENTS

| | | | |
|---|---|---|---|
| 3,327,791 A | 6/1967 | Harrigan, Jr. | |
| 3,427,580 A | 2/1969 | Brock | |
| 4,138,669 A | 2/1979 | Edison et al. | |
| 4,279,304 A | 7/1981 | Harper | |
| 4,303,128 A | 12/1981 | Marr, Jr. | |
| 4,345,650 A | 8/1982 | Wesley | |
| 4,364,587 A | 12/1982 | Samford | |
| 4,396,062 A | 8/1983 | Iskander | |
| 4,442,903 A | 4/1984 | Schutt et al. | |
| 4,467,833 A | 8/1984 | Satterwhite et al. | |
| 4,485,780 A | 12/1984 | Price et al. | |
| 4,495,990 A | 1/1985 | Titus et al. | |
| 4,526,667 A | 7/1985 | Parkhurst et al. | |
| 4,527,636 A | 7/1985 | Bordon | |
| 4,570,715 A | 2/1986 | Van Meurs et al. | |
| 4,618,197 A | 10/1986 | White | |
| 4,716,960 A | 1/1988 | Eastlund et al. | |
| 4,747,451 A | 5/1988 | Adams, Jr. et al. | |

(Continued)

OTHER PUBLICATIONS

International Search Report and Written Opinion issued May 26, 2009, for International Application Serial No. PCT/US08/075668, 11 pages.

(Continued)

*Primary Examiner* — Yong-Suk (Philip) Ro
(74) *Attorney, Agent, or Firm* — Smith IP Services, P.C.

(57) ABSTRACT

A method of selectively actuating from a remote location multiple downhole well tools includes: selecting one of the well tools for actuation by applying a voltage polarity to a set of conductors in the well, thereby operating a downhole pump connected to the well tool and displacing a piston of the well tool in one direction; and selecting the well tool for actuation by applying an opposite voltage polarity to the set of conductors, thereby operating the downhole pump and displacing the piston in an opposite direction. A system includes multiple electrical conductors in the well; and multiple control devices that control which of the well tools is selected for actuation in response to current flow in a set of the conductors, each of the control devices including at least one downhole pump which applies a pressure differential to an actuator of a respective one of the well tools.

19 Claims, 10 Drawing Sheets

U.S. PATENT DOCUMENTS

| | | | |
|---|---|---|---|
| 4,765,184 A | 8/1988 | Delatorre | |
| 4,911,239 A | 3/1990 | Winckler et al. | |
| 4,919,201 A | 4/1990 | Bridges et al. | |
| 4,921,438 A | 5/1990 | Godfrey et al. | |
| 4,945,995 A | 8/1990 | Tholance et al. | |
| 4,967,048 A | 10/1990 | Langston | |
| 4,984,594 A | 1/1991 | Vinegar et al. | |
| 5,022,485 A | 6/1991 | Mitchell | |
| RE33,690 E | 9/1991 | Adams, Jr. et al. | |
| 5,058,683 A | 10/1991 | Godfrey et al. | |
| 5,099,918 A | 3/1992 | Bridges et al. | |
| 5,166,677 A | 11/1992 | Schoenberg | |
| 5,207,273 A | 5/1993 | Cates et al. | |
| 5,251,703 A | 10/1993 | Skinner | |
| 5,279,363 A | 1/1994 | Schultz et al. | |
| 5,282,508 A | 2/1994 | Ellingsen et al. | |
| 5,332,035 A | 7/1994 | Schultz et al. | |
| 5,343,963 A | 9/1994 | Bouldin et al. | |
| 5,375,658 A | 12/1994 | Schultz et al. | |
| 5,516,603 A | 5/1996 | Holcombe | |
| 5,547,029 A | 8/1996 | Rubbo et al. | |
| 5,839,508 A | 11/1998 | Tubel et al. | |
| 5,868,201 A | 2/1999 | Bussear et al. | |
| 6,032,733 A | 3/2000 | Ludwig et al. | |
| 6,164,375 A | 12/2000 | Carisella | |
| 6,176,308 B1 | 1/2001 | Pearson | |
| 6,247,536 B1 | 6/2001 | Leismer et al. | |
| 6,315,043 B1 | 11/2001 | Farrant et al. | |
| 6,315,049 B1 | 11/2001 | Hickey et al. | |
| 6,433,991 B1 | 8/2002 | Deaton et al. | |
| 6,450,263 B1 | 9/2002 | Schwendemann | |
| 6,464,011 B2 * | 10/2002 | Tubel | 166/313 |
| 6,547,010 B2 | 4/2003 | Hensley et al. | |
| 6,567,013 B1 | 5/2003 | Purkis et al. | |
| 6,668,936 B2 * | 12/2003 | Williamson et al. | 166/375 |
| 6,679,332 B2 | 1/2004 | Vinegar et al. | |
| 6,725,925 B2 | 4/2004 | Al-Ramadhan | |
| 6,912,142 B2 | 6/2005 | Keim et al. | |
| 6,958,704 B2 | 10/2005 | Vinegar et al. | |
| 6,967,589 B1 | 11/2005 | Peters | |
| 7,007,756 B2 | 3/2006 | Lerche et al. | |
| 7,011,152 B2 | 3/2006 | Soelvik | |
| 7,017,662 B2 | 3/2006 | Schultz et al. | |
| 7,040,391 B2 | 5/2006 | Leuthen et al. | |
| 7,066,261 B2 | 6/2006 | Vicente et al. | |
| 7,145,471 B2 | 12/2006 | Purkis et al. | |
| 7,322,409 B2 | 1/2008 | Wittle et al. | |
| 7,440,283 B1 | 10/2008 | Rafie | |
| 7,468,890 B2 | 12/2008 | Lin | |
| 7,520,321 B2 | 4/2009 | Hiron et al. | |
| 2002/0050354 A1 * | 5/2002 | Schultz et al. | 166/250.01 |
| 2003/0051881 A1 * | 3/2003 | Vinegar et al. | 166/374 |
| 2006/0185848 A1 | 8/2006 | Surjaatmadja et al. | |

OTHER PUBLICATIONS

International Search Report and Written Opinion issued Jul. 27, 2009, for International Application Serial No. PCT/US09/046363, 8 pages.

International Search Report and Written Opinion issued Jul. 27, 2009, for International Application Serial No. PCT/US09/046404, 8 pages.

International Preliminary Report on Patentability issued Mar. 24, 2011, for International Patent Application No. PCT/US08/075668, 6 pages.

International Preliminary Report on Patentability issued Mar. 24, 2011, for International Patent Application No. PCT/US09/046404, 7 pages.

Office Action issued Oct. 22, 2012 U.S. Appl. No. 12/792,298. 40 pages.

Australian Examination Report issued Mar. 22, 2012 for AU Patent Application No. 2010286756, 2 pages.

Canadian Office Action issued Jul. 3, 2012 for CA Patent Application No. 2735261, 2 pages.

* cited by examiner

US 8,453,723 B2

CONTROL OF WELL TOOLS UTILIZING DOWNHOLE PUMPS

CROSS-REFERENCE TO RELATED APPLICATIONS

This application is a continuation-in-part of prior International Application Serial No. PCT/US08/75668, filed Sep. 9, 2008. This application also claims the benefit under 35 USC §119 of the filing date of International Application Serial No. PCT/US09/46404, filed Jun. 5, 2009. The entire disclosures of these prior applications are incorporated herein by this reference.

BACKGROUND

The present disclosure relates generally to operations performed and equipment utilized in conjunction with a subterranean well and, in an embodiment described herein, more particularly provides for control of well tools utilizing downhole pumps.

It is useful to be able to selectively actuate well tools in a subterranean well. For example, production flow from each of multiple zones of a reservoir can be individually regulated by using a remotely controllable choke for each respective zone. The chokes can be interconnected in a production tubing string so that, by varying the setting of each choke, the proportion of production flow entering the tubing string from each zone can be maintained or adjusted as desired.

Unfortunately, this concept is more complex in actual practice. In order to be able to individually actuate multiple downhole well tools, a relatively large number of wires, lines, etc. have to be installed and/or complex wireless telemetry and downhole power systems need to be utilized. Each of these scenarios involves use of relatively unreliable downhole electronics and/or the extending and sealing of many lines through bulkheads, packers, hangers, wellheads, etc.

Therefore, it will be appreciated that advancements in the art of remotely actuating downhole well tools are needed. Such advancements would preferably reduce the number of lines, wires, etc. installed, and would preferably minimize the need for downhole electronics.

SUMMARY

In carrying out the principles of the present disclosure, systems and methods are provided which advance the art of downhole well tool control. One example is described below in which a relatively large number of well tools may be selectively actuated using a relatively small number of lines, wires, etc. Another example is described below in which a direction of current flow through, or polarity of voltage across, a set of conductors is used to select which of multiple well tools is to be actuated. Yet another example is described below in which downhole pumps are used to provide pressure differentials for actuating the well tools.

In one aspect, a method of selectively actuating from a remote location multiple downhole well tools in a well is provided. The method includes the steps of: selecting one of the well tools for actuation by applying a voltage polarity to a set of conductors in the well, thereby operating a downhole pump connected to the well tool and displacing a piston of the well tool in one direction; and selecting the well tool for actuation by applying an opposite voltage polarity to the set of conductors, thereby operating the downhole pump and displacing the piston in an opposite direction.

In another aspect, a system for selectively actuating from a remote location multiple downhole well tools in a well is provided which includes multiple electrical conductors in the well; and multiple control devices that control which of the well tools is selected for actuation in response to current flow in at least one set of the conductors. Each of the control devices includes at least one downhole pump which applies a pressure differential to an actuator of a respective one of the well tools.

In yet another aspect, a method of selectively actuating from a remote location multiple downhole well tools in a well includes the steps of: selecting a first one of the well tools for actuation by applying voltage potential across a first set of conductors in the well, thereby operating a first downhole pump connected to the first well tool; and selecting a second one of the well tools for actuation by applying voltage potential across a second set of conductors in the well, thereby operating a second downhole pump connected to the second well tool.

One of the conductors may be a tubular string extending into the earth, or in effect "ground."

These and other features, advantages, benefits and objects will become apparent to one of ordinary skill in the art upon careful consideration of the detailed description of representative embodiments of the disclosure hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above," "below," "upper," "lower," etc., are used for convenience in referring to the accompanying drawings. In general, "above," "upper," "upward" and similar terms refer to a direction toward the earth's surface along a wellbore, and "below," "lower," "downward" and similar terms refer to a direction away from the earth's surface along the wellbore.

Figure 1:
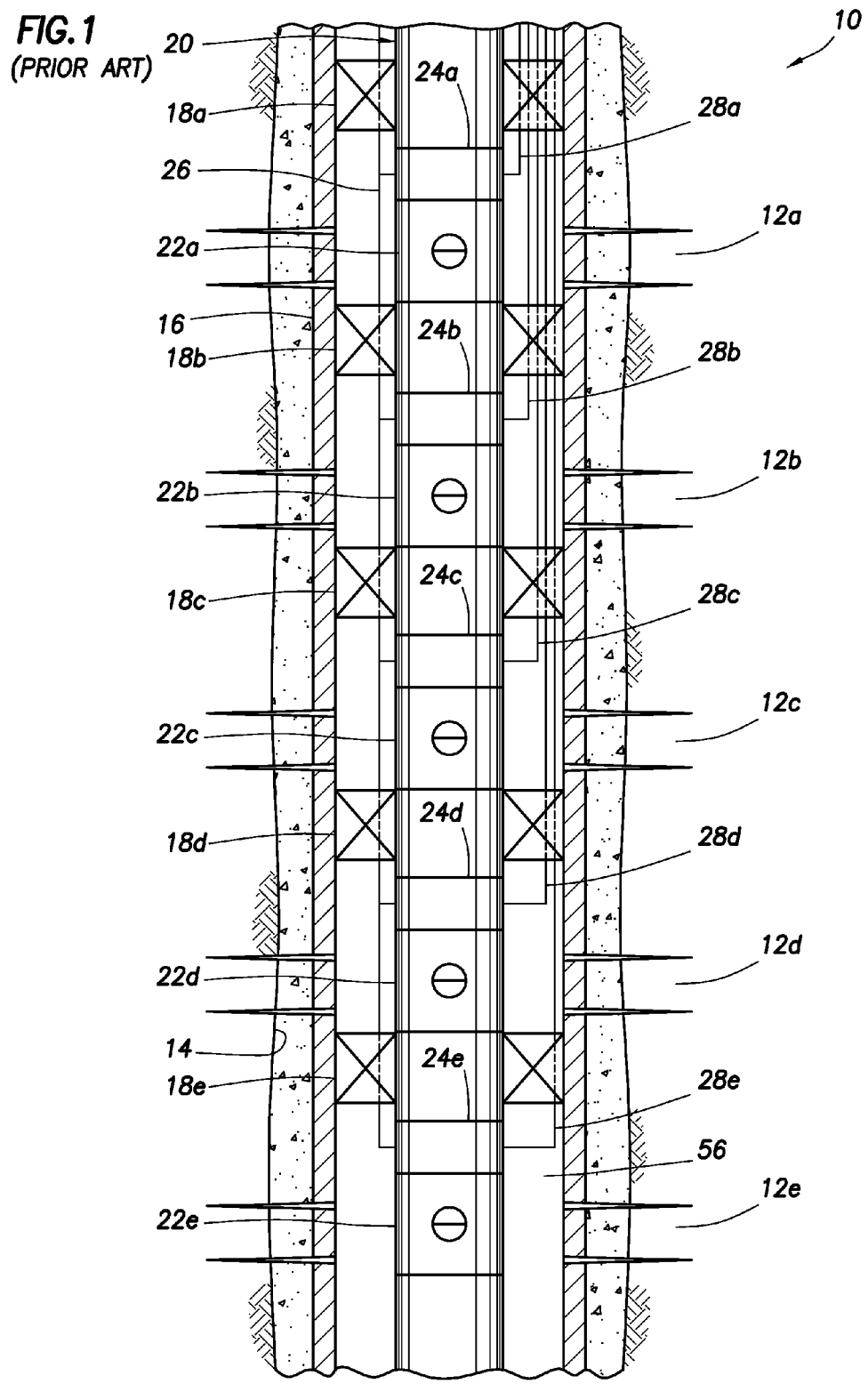
FIG. 1 is a schematic view of a prior art well control system.

Representatively illustrated in FIG. 1 is a well control system 10 which is used to illustrate the types of problems inherent in prior art systems and methods. Although the drawing depicts prior art concepts, it is not meant to imply that any particular prior art well control system included the exact configuration illustrated in FIG. 1.

The control system 10 as depicted in FIG. 1 is used to control production flow from multiple zones 12a-e intersected by a wellbore 14. In this example, the wellbore 14 has been cased and cemented, and the zones 12a-e are isolated within a casing string 16 by packers 18a-e carried on a production tubing string 20.

Fluid communication between the zones 12a-e and the interior of the tubing string 20 is controlled by means of flow control devices 22a-e interconnected in the tubing string. The flow control devices 22a-e have respective actuators 24a-e for actuating the flow control devices open, closed or in a flow choking position between open and closed.

In this example, the control system 10 is hydraulically operated, and the actuators 24a-e are relatively simple piston-and-cylinder actuators. Each actuator 24a-e is connected to two hydraulic lines—a balance line 26 and a respective one of multiple control lines 28a-e. A pressure differential between the balance line 26 and the respective control line 28a-e is applied from a remote location (such as the earth's surface, a subsea wellhead, etc.) to displace the piston of the corresponding actuator 24a-e and thereby actuate the associated flow control device 22a-e, with the direction of displacement being dependent on the direction of the pressure differential.

There are many problems associated with the control system 10. One problem is that a relatively large number of lines 26, 28a-e are needed to control actuation of the devices 22a-e. These lines 26, 28a-e must extend through and be sealed off at the packers 18a-e, as well as at various bulkheads, hangers, wellhead, etc.

Another problem is that it is difficult to precisely control pressure differentials between lines extending perhaps a thousand or more meters into the earth. This can lead to improper or unwanted actuation of the devices 22a-e, as well as imprecise regulation of flow from the zones 12a-e.

Attempts have been made to solve these problems by using downhole electronic control modules for selectively actuating the devices 22a-e. However, these control modules include sensitive electronics which are frequently damaged by the hostile downhole environment (high temperature and pressure, etc.).

Furthermore, electrical power must be supplied to the electronics by specialized high temperature batteries, by downhole power generation or by wires which (like the lines 26, 28a-e) must extend through and be sealed at various places in the system. Signals to operate the control modules must be supplied via the wires or by wireless telemetry, which includes its own set of problems.

Thus, the use of downhole electronic control modules solves some problems of the control system 10, but introduces other problems. Likewise, mechanical and hydraulic solutions have been attempted, but most of these are complex, practically unworkable or failure-prone.

Figure 2:
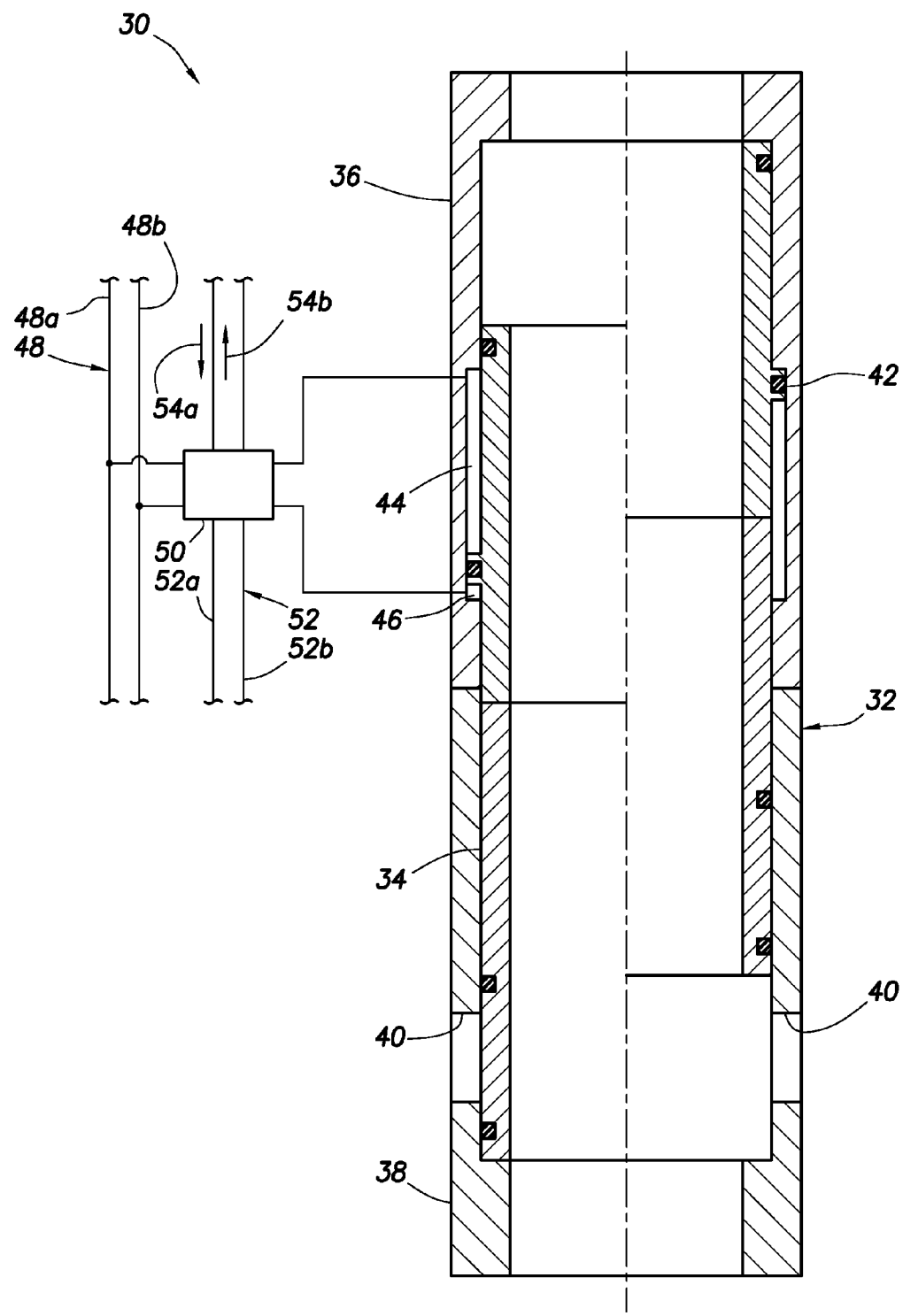
FIG. 2 is an enlarged scale schematic view of a well tool and associated control device which embody principles of the present disclosure.

Turning now to FIG. 2, a system 30 and associated method for selectively actuating multiple well tools 32 are representatively illustrated. Only a single well tool 32 is depicted in FIG. 2 for clarity of illustration and description, but the manner in which the system 30 may be used to selectively actuate multiple well tools is described more fully below.

The well tool 32 in this example is depicted as including a flow control device 38 (such as a valve or choke), but other types or combinations of well tools may be selectively actuated using the principles of this disclosure, if desired. A sliding sleeve 34 is displaced upwardly or downwardly by an actuator 36 to open or close ports 40. The sleeve 34 can also be used to partially open the ports 40 and thereby variably restrict flow through the ports.

The actuator 36 includes an annular piston 42 which separates two chambers 44, 46. The chambers 44, 46 are connected to lines 48a,b via a control device 50. D.C. current flow in a set of electrical conductors 52a,b is used to select whether the well tool 32 is to be actuated in response to a pressure differential between the lines 48a,b.

In one example, the well tool 32 is selected for actuation by flowing current between the conductors 52a,b in a first direction 54a (in which case the chambers 44, 46 are connected to the lines 48a,b), but the well tool 32 is not selected for actuation when current flows between the conductors 52a,b in a second, opposite, direction 54b (in which case the chambers 44, 46 are isolated from the lines 48a,b). Various configurations of the control device 50 are described below for accomplishing this result. These control device 50 configurations are advantageous in that they do not require complex, sensitive or unreliable electronics or mechanisms, but are instead relatively simple, economical and reliable in operation.

The well tool 32 may be used in place of any or all of the flow control devices 22a-e and actuators 24a-e in the system 10 of FIG. 1. Suitably configured, the principles of this disclosure could also be used to control actuation of other well tools, such as selective setting of the packers 18a-e, etc.

Note that the hydraulic lines 48a,b are representative of one type of fluid pressure source 48 which may be used in keeping with the principles of this disclosure. It should be understood that other fluid pressure sources (such as pressure within the tubing string 20, pressure in an annulus 56 between the tubing and casing strings 20, 16, pressure in an atmospheric or otherwise pressurized chamber, a downhole pump, etc.), may be used as fluid pressure sources in conjunction with the control device 50 for supplying pressure to the actuator 36 in other embodiments.

The conductors 52a,b comprise a set of conductors 52 through which current flows, and this current flow is used by the control device 50 to determine whether the associated well tool 32 is selected for actuation. Two conductors 52a,b are depicted in FIG. 2 as being in the set of conductors 52, but it should be understood that any number of conductors may be used in keeping with the principles of this disclosure. In addition, the conductors 52a,b can be in a variety of forms, such as wires, metal structures (for example, the casing or tubing strings 16, 20, etc.), or other types of conductors.

The conductors 52*a,b* preferably extend to a remote location (such as the earth's surface, a subsea wellhead, another location in the well, etc.). For example, a surface power supply and multiplexing controller can be connected to the conductors 52*a,b* for flowing current in either direction 54*a,b* between the conductors.

Figure 3:
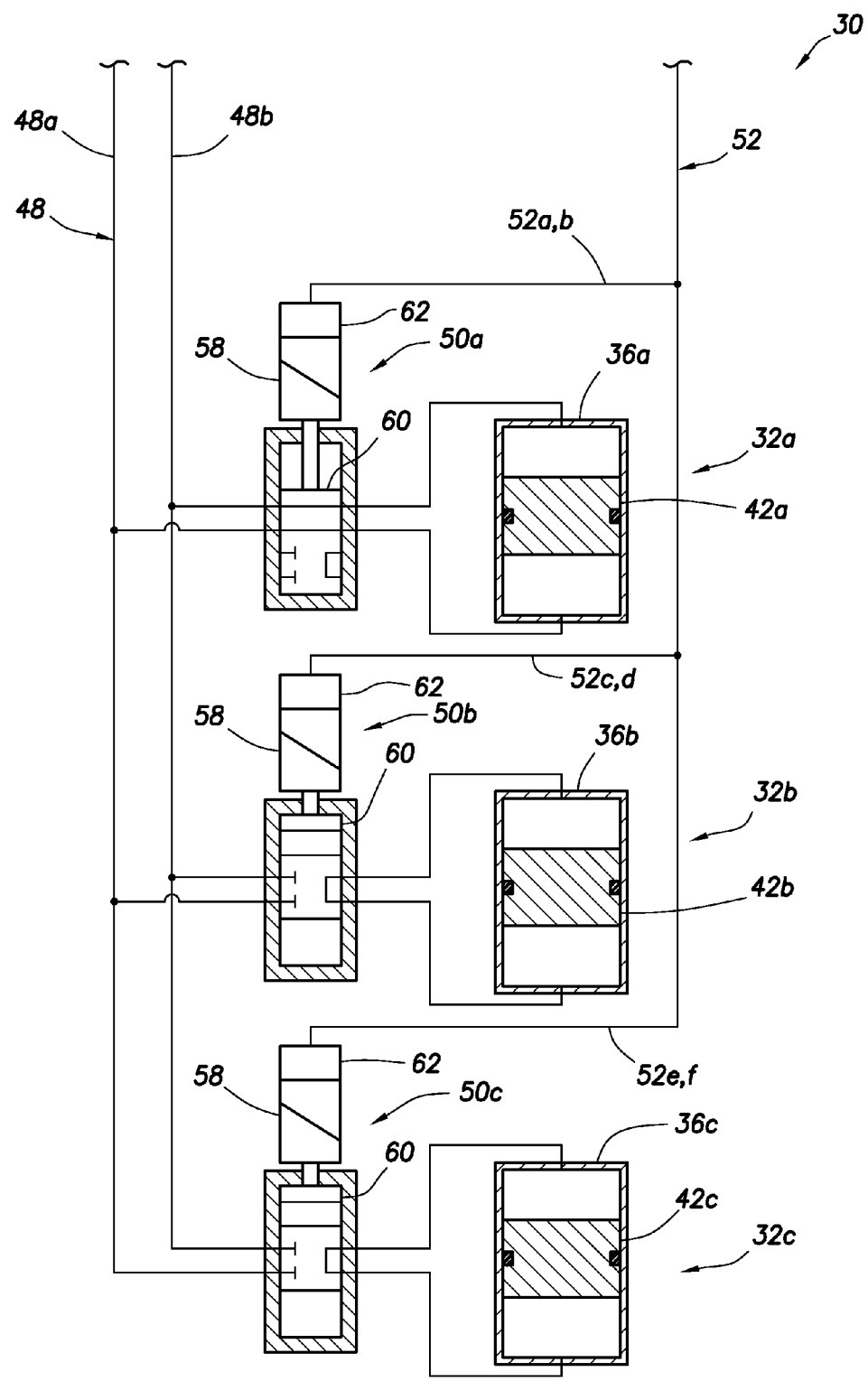
FIG. 3 is a schematic electrical and hydraulic diagram showing a system and method for remotely actuating multiple downhole well tools.

Referring additionally now to FIG. 3, a somewhat more detailed illustration of the electrical and hydraulic aspects of one example of the system 30 are provided. In addition, FIG. 3 provides for additional explanation of how multiple well tools 32 may be selectively actuated using the principles of this disclosure.

In this example, multiple control devices 50*a-c* are associated with respective multiple actuators 36*a-c* of multiple well tools 32*a-c*. It should be understood that any number of control devices, actuators and well tools may be used in keeping with the principles of this disclosure, and that these elements may be combined, if desired (for example, multiple control devices could be combined into a single device, a single well tool can include multiple functional well tools, an actuator and/or control device could be built into a well tool, etc.).

Each of the control devices 50*a-c* depicted in FIG. 3 includes a solenoid actuated spool or poppet valve. A solenoid 58 of the control device 50*a* has displaced a spool or poppet valve 60 to a position in which the actuator 36*a* is now connected to the lines 48*a,b* (or another type of pressure source 48, for example, the lines 48*a,b* could correspond to the input and output of a downhole pump, etc.). A pressure differential between the lines 48*a,b* can now be used to displace the piston 42*a* and actuate the well tool 32*a*. The remaining control devices 50*b,c* prevent actuation of their associated well tools 32*b,c* by isolating the lines 48*a,b* from the actuators 36*b,c*.

The control device 50*a* responds to current flow through a certain set of the conductors 52. In this example, conductors 52*a,b* are connected to the control device 50*a*. When current flows in one direction through the conductors 52*a,b*, the control device 50*a* causes the actuator 36*a* to be operatively connected to the lines 48*a,b*, but when current flows in an opposite direction through the conductors, the control device causes the actuator to be operatively isolated from the lines.

As depicted in FIG. 3, the other control devices 50*b,c* are connected to different sets of the conductors 52. For example, control device 50*b* is connected to conductors 52*c,d* and control device 50*c* is connected to conductors 52*e,f*.

When current flows in one direction through the conductors 52*c,d*, the control device 50*b* causes the actuator 36*b* to be operatively connected to the lines 48*a,b*, but when current flows in an opposite direction through the conductors, the control device causes the actuator to be operatively isolated from the lines. Similarly, when current flows in one direction through the conductors 52*e,f*, the control device 50*c* causes the actuator 36*c* to be operatively connected to the lines 48*a,b*, but when current flows in an opposite direction through the conductors, the control device causes the actuator to be operatively isolated from the lines.

However, it should be understood that multiple control devices are preferably, but not necessarily, connected to each set of conductors. By connecting multiple control devices to the same set of conductors, the advantages of a reduced number of conductors can be obtained, as explained more fully below.

The function of selecting a particular well tool 32*a-c* for actuation in response to current flow in a particular direction between certain conductors is provided by directional elements 62 of the control devices 50*a-c*. Various different types of directional elements 62 are described more fully below.

Figure 4:
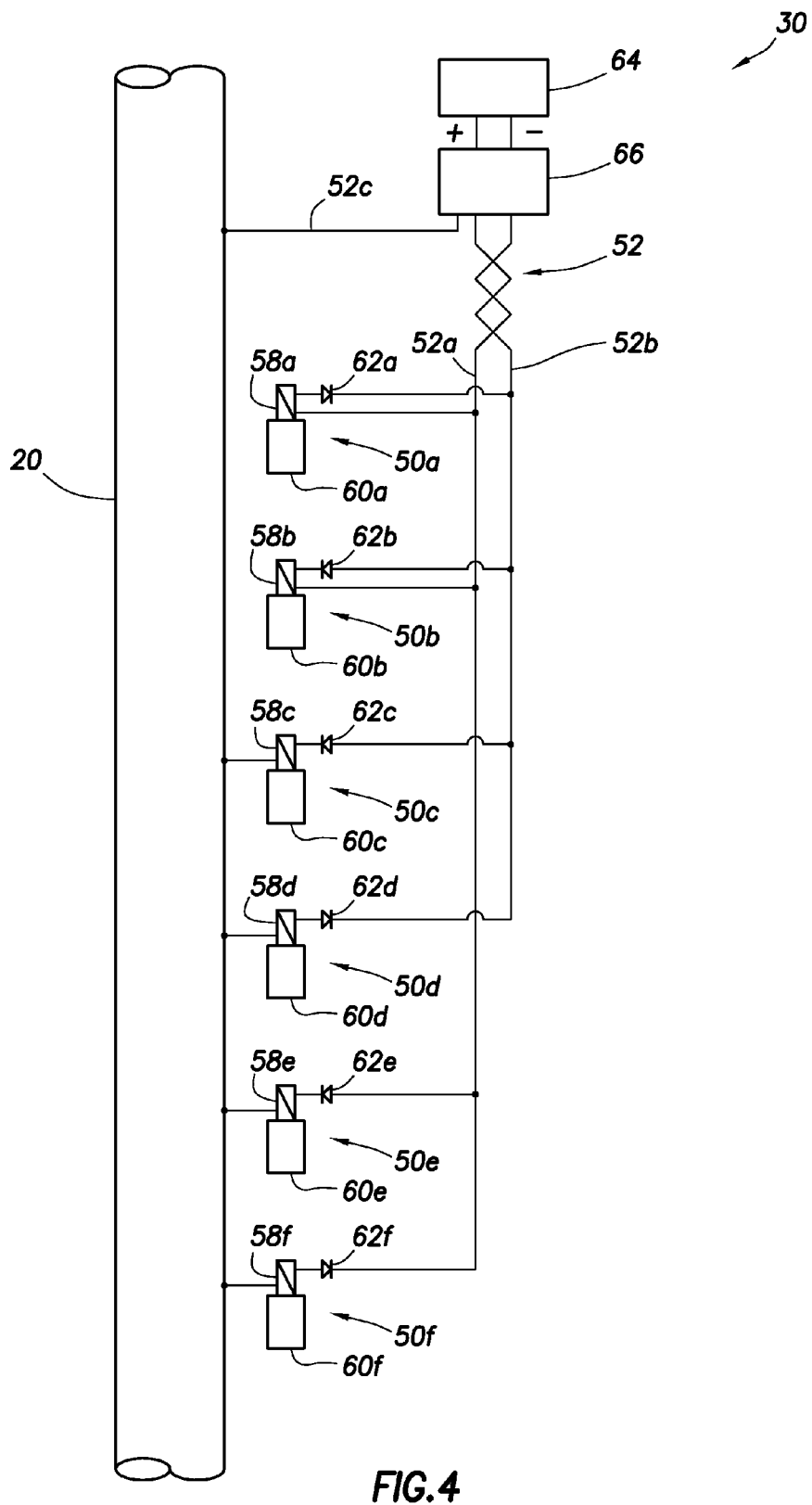
FIG. 4 is a schematic electrical diagram showing another configuration of the system and method for remotely actuating multiple downhole well tools.

Referring additionally now to FIG. 4, an example of the system 30 is representatively illustrated, in which multiple control devices are connected to each of multiple sets of conductors, thereby achieving the desired benefit of a reduced number of conductors in the well. In this example, actuation of six well tools may be selectively controlled using only three conductors, but, as described herein, any number of conductors and well tools may be used in keeping with the principles of this disclosure.

As depicted in FIG. 4, six control devices 50*a-f* are illustrated apart from their respective well tools. However, it will be appreciated that each of these control devices 50*a-f* would in practice be connected between the fluid pressure source 48 (such as lines 48*a,b*, a downhole pump, etc.) and a respective actuator 36 of a respective well tool 32 (for example, as described above and depicted in FIGS. 2 & 3).

The control devices 50*a-f* include respective solenoids 58*a-f*, spool valves 60*a-f* and directional elements 62*a-f*. In this example, the elements 62*a-f* are diodes. Although the solenoids 58*a-f* and directional elements 62*a-f* are electrical components, they do not comprise complex or unreliable electronic circuitry, and suitable reliable high temperature solenoids and diodes are readily available.

A power supply 64 is used as a source of direct current. The power supply 64 could also be a source of alternating current and/or command and control signals, if desired. However, the system 30 as depicted in FIG. 4 relies on directional control of current in the conductors 52 in order to selectively actuate the well tools 32, so alternating current, signals, etc. should be present on the conductors only if such would not interfere with this selection function. If the casing string 16 and/or tubing string 20 is used as a conductor in the system 30, then preferably the power supply 64 comprises a floating power supply.

The conductors 52 may also be used for telemetry, for example, to transmit and receive data and commands between the surface and downhole well tools, actuators, sensors, etc. This telemetry can be conveniently transmitted on the same conductors 52 as the electrical power supplied by the power supply 64.

The conductors 52 in this example comprise three conductors 52*a-c*. The conductors 52 are also arranged as three sets of conductors 52*a,b* 52*b,c* and 52*a,c*. Each set of conductors includes two conductors. Note that a set of conductors can share one or more individual conductors with another set of conductors.

Each conductor set is connected to two control devices. Thus, conductor set 52*a,b* is connected to each of control devices 50*a,b*, conductor set 52*b,c* is connected to each of control devices 50*c,d*, and conductor set 52*a,c* is connected to each of control devices 50*e,f*.

In this example, the tubing string 20 is part of the conductor 52*c*. Alternatively, or in addition, the casing string 16 or any other conductor can be used in keeping with the principles of this disclosure.

It will be appreciated from a careful consideration of the system 30 as depicted in FIG. 4 (including an observation of how the directional elements 62*a-f* are arranged between the solenoids 58*a-f* and the conductors 52*a-c*) that different current flow directions between different conductors in the different sets of conductors can be used to select which of the solenoids 58*a-f* are powered to thereby actuate a respective well tool. For example, current flow from conductor 52*a* to conductor 52*b* will provide electrical power to solenoid 58*a* via directional element 62*a*, but oppositely directed current flow from conductor 52b to conductor 52a will provide electrical power to solenoid 58b via directional element 62b. Conversely, directional element 62a will prevent solenoid 58a from being powered due to current flow from conductor 52b to conductor 52a, and directional element 62b will prevent solenoid 58b from being powered due to current flow from conductor 52a to conductor 52b.

Similarly, current flow from conductor 52b to conductor 52c will provide electrical power to solenoid 58c via directional element 62c, but oppositely directed current flow from conductor 52c to conductor 52b will provide electrical power to solenoid 58d via directional element 62d. Directional element 62c will prevent solenoid 58c from being powered due to current flow from conductor 52c to conductor 52b, and directional element 62d will prevent solenoid 58d from being powered due to current flow from conductor 52b to conductor 52c.

Current flow from conductor 52a to conductor 52c will provide electrical power to solenoid 58e via directional element 62e, but oppositely directed current flow from conductor 52c to conductor 52a will provide electrical power to solenoid 58f via directional element 62f. Directional element 62e will prevent solenoid 58e from being powered due to current flow from conductor 52c to conductor 52a, and directional element 62f will prevent solenoid 58f from being powered due to current flow from conductor 52a to conductor 52c.

The direction of current flow between the conductors 52 is controlled by means of a switching device 66. The switching device 66 is interconnected between the power supply 64 and the conductors 52, but the power supply and switching device could be combined, or could be part of an overall control system, if desired.

Figure 5:
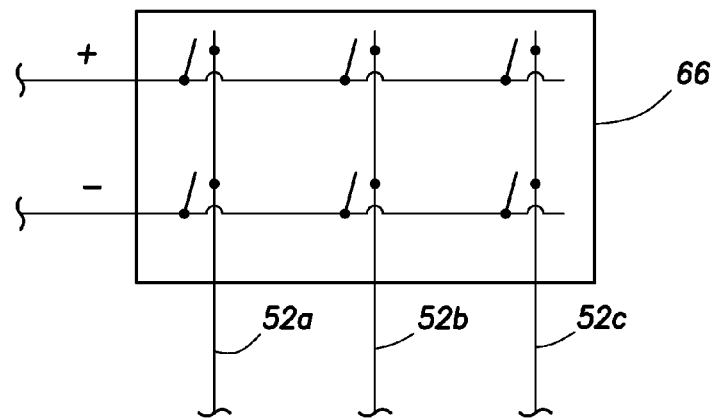
FIG. 5 is a schematic electrical diagram showing details of a switching arrangement which may be used in the system of FIG. 4.
Figure 6:
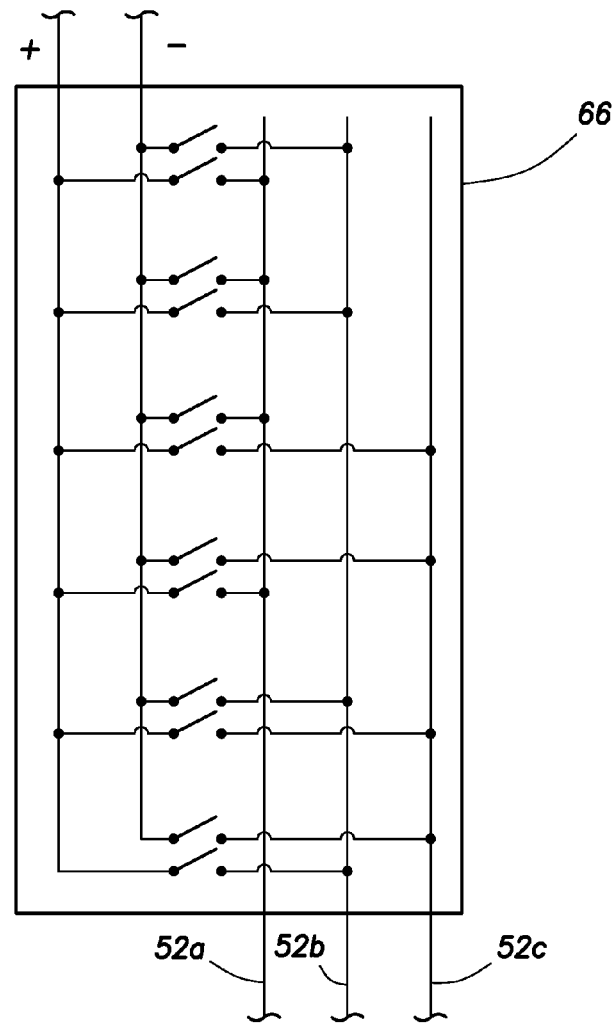
FIG. 6 is a schematic electrical diagram showing details of another switching arrangement which may be used in the system of FIG. 4.

Examples of different configurations of the switching device 66 are representatively illustrated in FIGS. 5 & 6. FIG. 5 depicts an embodiment in which six independently controlled switches are used to connect the conductors 52a-c the two polarities of the power supply 64. FIG. 6 depicts an embodiment in which an appropriate combination of switches are closed to select a corresponding one of the well tools for actuation. This embodiment might be implemented, for example, using a rotary switch. Other implementations (such as using a programmable logic controller, etc.) may be utilized as desired.

Note that multiple well tools 32 may be selected for actuation at the same time. For example, multiple similarly configured control devices 50 could be wired in series or parallel to the same set of the conductors 52, or control devices connected to different sets of conductors could be operated at the same time by flowing current in appropriate directions through the sets of conductors.

In addition, note that fluid pressure to actuate the well tools 32 may be supplied by one of the lines 48a,b, and another one of the lines (or another flow path, such as an interior of the tubing string 20 or the annulus 56) may be used to exhaust fluid from the actuators 36. An appropriately configured and connected spool valve can be used, so that the same one of the lines 48a,b can be used to supply fluid pressure to displace the pistons 42 of the actuators 36 in each direction.

Preferably, in each of the above-described embodiments, the fluid pressure source 48 is pressurized prior to flowing current through the selected set of conductors 52 to actuate a well tool 32. In this manner, actuation of the well tool 32 immediately follows the initiation of current flow in the set of conductors 52.

Figure 7:
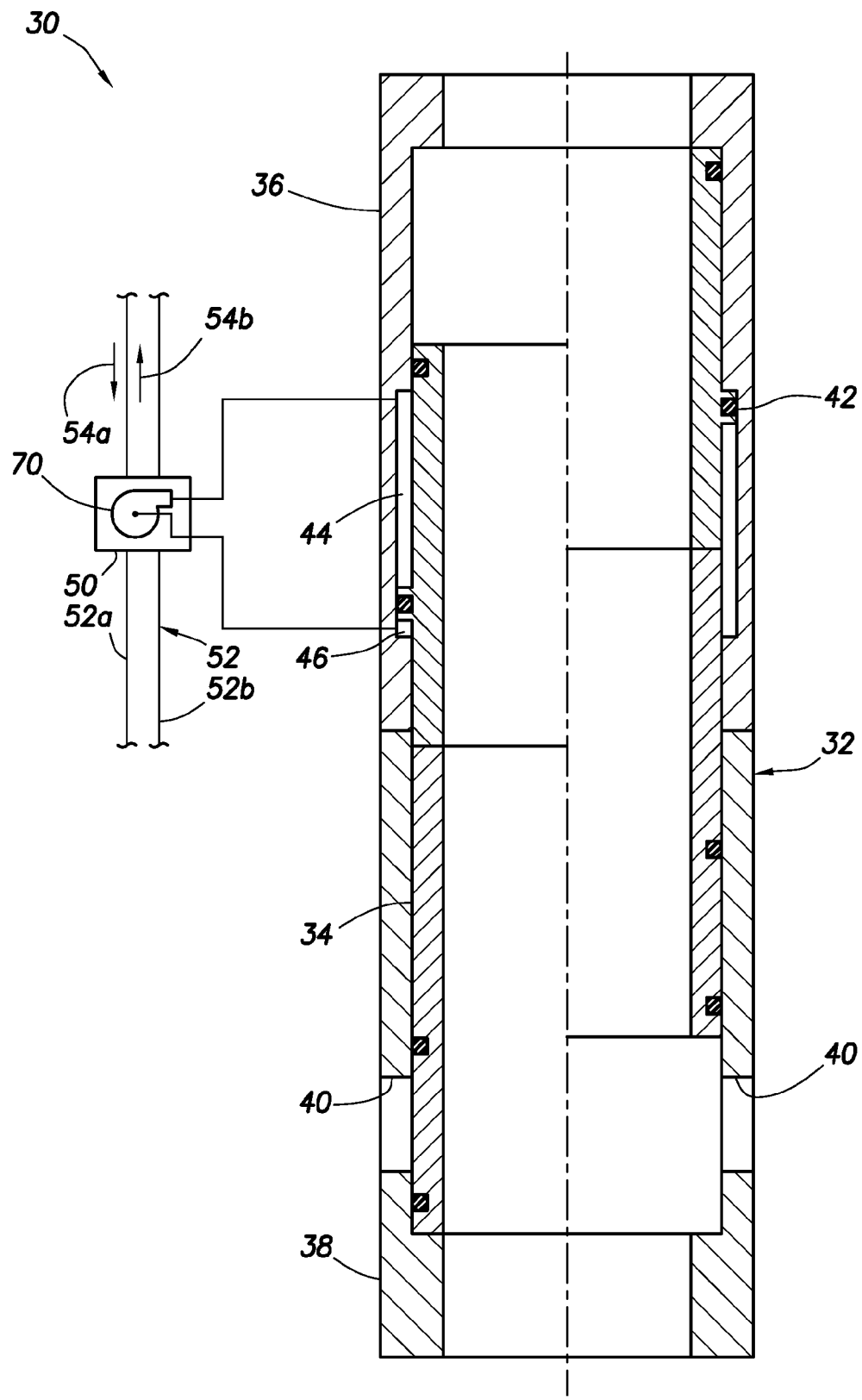
FIG. 7 is a schematic view of the well tool and another configuration of the associated control device which embody principles of the present disclosure.

Referring additionally now to FIG. 7, the system 30 is depicted in a configuration similar in most respects to that of FIG. 2. In FIG. 7, however, the system 30 does not utilize the lines 48a,b connected to each of the well tools 32. Instead, the electric potential and current delivered into the well by the conductors 52, in order to select a control device 50 for actuation of its respective well tool 32, is also used to operate a pump 70 of the control device to thereby provide fluid pressure downhole for operating the actuator 36.

In this manner, the use of the lines 48a,b extending to a remote location can be eliminated, thereby enabling a simpler and more reliable installation, without sacrificing any of the functionality of the system 30. Various examples of the system 30 utilizing control devices 50 having pumps 70 therein are depicted in FIGS. 8-11 and are described more fully below.

Figure 8:
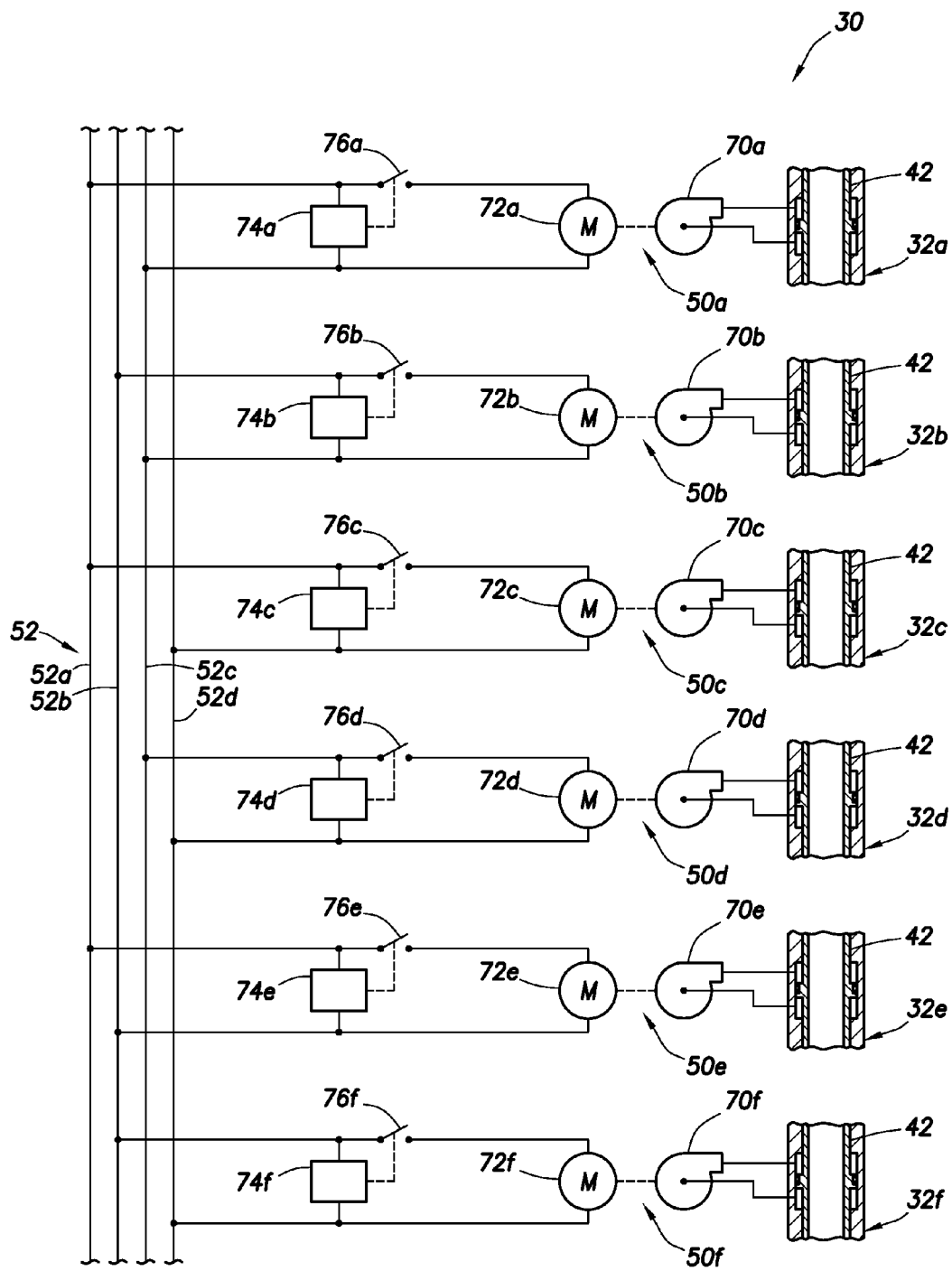
FIG. 8 is a schematic electrical diagram showing details of another configuration of the system and method, in which the control devices include downhole pumps and motors for actuating the well tools.

In FIG. 8, a configuration of the system 30 is representatively illustrated in which four conductors 52a-f are used to control actuation of six well tools 32a-f. Six control devices 50a-f are interconnected between the conductors 52a-f and respective ones of the well tools 32a-f.

However, it should be clearly understood that any numbers and combinations of these elements can be used, and it is not necessary for there to be a one-to-one relationship between the well tools 32a-f and control devices 50a-f (for example, a well tool can include more than one actuator, in which case more than one control device may be used for the well tool, or a control device can control actuation of more than one well tool, etc.). Thus, this disclosure is not limited to only the configurations specifically depicted in the drawings and described herein.

Electric motors 72a-f are used to drive the respective pumps 70a-f. The motors 72a-f are interconnected to the conductors 52a-d in a unique pattern, so that a voltage potential applied across a selected two of the conductors will result in a respective one of the motors 72a-f being selected for operation. Thus, motor 72a is connected to conductors 52a,c, motor 72b is connected to conductors 52b,c, motor 72c is connected to conductors 52a,d, motor 72d is connected to conductors 52c,d, motor 72e is connected to conductors 52a,b and motor 72f is connected to conductors 52b,d.

It is possible for a potential applied across a selected two of the conductors 52 to result in a current sneak path through unintended ones of the control devices 50a-f, as described in the international patent application entitled SNEAK PATH ELIMINATOR FOR DIODE MULTIPLEXED CONTROL OF DOWNHOLE WELL TOOLS, having agent file reference 09-021956U1, filed concurrently herewith. The entire disclosure of this international patent application is incorporated herein by this reference.

To eliminate such current sneak paths, the system utilizes under-voltage lockout devices 74a-f to prevent current from flowing through the respective control devices 50a-f, unless the voltage applied across the lockout devices exceeds a preselected minimum. As depicted in FIG. 8, the lockout devices 74a-f include switches 76a-f which close when the voltage applied across the respective one of the lockout devices 74a-f exceeds a preselected minimum, thereby applying the voltage to the respective one of the motors 72a-f and selecting the respective one of the control devices 50a-f for actuation of its associated one of the well tools 32a-f. To close the switches 76a-f, the lockout devices 74a-f can include relays, triacs (not shown), or the lockout devices can include any of the other devices (such as zener diodes, thyristors, SCR's, MOSFET's, transistors, etc.) described in the incorporated international patent application, or any other type of under-voltage lockout device.

Thus, in the case of the control device 50a and its associated well tool 32a in the configuration of the system 30 depicted in FIG. 8, the control device is selected for actuation of the well tool by applying at least the minimum voltage potential across the conductors 52a,c. The lockout device 74a senses that at least the minimum voltage potential has been applied, and closes the switch 76a, thereby providing the voltage potential to the motor 72a.

The motor 72a drives the pump 70a, thereby applying a pressure differential across the piston 42 of the well tool 32a. The piston 42 displaces to thereby operate the well tool 32a, for example, by opening or closing the flow control device 38 (see FIG. 7).

In this configuration of the system 30, the motors 72a-f are preferably brushed permanent magnet DC reversible motors. In this manner, the polarity of the voltage applied across the appropriate conductors 52 determines the direction of rotation of the selected one of the motors 72a-f.

For example, if one polarity of at least the minimum voltage is applied to the conductors 52a,c, the motor 72a will rotate in one direction (e.g., clockwise), and if an opposite polarity of the voltage is applied to the conductors 52a,c, the motor will rotate in an opposite direction (e.g., counter-clockwise). The pumps 72a-f are also reversible, so that the pistons 42 can be displaced in opposite directions by driving the pumps in corresponding opposite directions. Thus, one polarity of voltage applied across the conductors 52a,c may cause the piston 42 of the well tool 32a to displace downward, and an opposite polarity of the voltage applied across the conductors 52a,c may cause the piston to displace upward.

Figure 9:
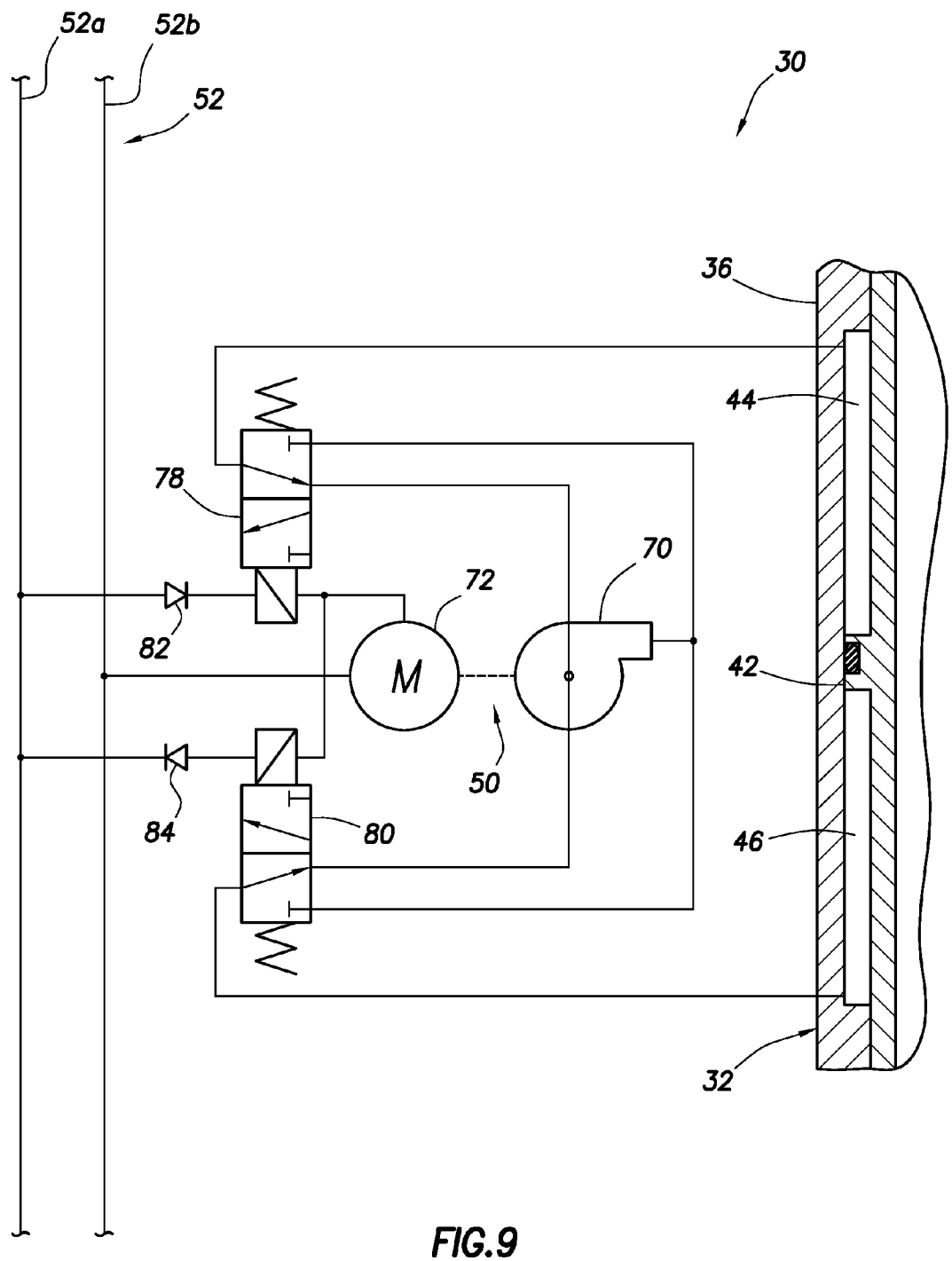
FIG. 9 is a schematic electrical diagram showing details of another configuration of the system and method, in which shuttle valves are used to control direction of actuation of the well tool.

In FIG. 9, another configuration of the system 30 is representatively illustrated. A control device 50 configuration is depicted in FIG. 9, which can be substituted for any of the control devices 50a-f of FIG. 8.

The pump 70 and motor 72 in this configuration are not necessarily reversible. Instead, a pair of shuttle valves 78, 80 are used to direct the output and input of the pump 70 to the chambers 44, 46 of the actuator 36 as needed to displace the piston 42 in a desired direction.

When a voltage is applied between two of the conductors 52 connected to the control device 50, one of the shuttle valves 78, 80 will be actuated. Which one of the shuttle valves 78, 80 is actuated depends upon the polarity of the voltage applied to the conductors 52. Diodes 82, 84 allow current flow in only one direction between each of the shuttle valves 78, 80 and the conductor 52a.

If the shuttle valve 78 is actuated, the output of the pump 70 will be in communication with the upper chamber 44, and the input of the pump will be in communication with the lower chamber 46, and so a pressure differential generated by the pump will cause the piston 42 to be biased downwardly. If the shuttle valve 80 is actuated, the input of the pump 70 will be in communication with the upper chamber 44, and the output of the pump will be in communication with the lower chamber 46, and so a pressure differential generated by the pump will cause the piston 42 to be biased upwardly. The motor 72 preferably rotates in the same direction whether current flows through the diode 82 or through the diode 84.

Note that the under-voltage lockout device described above (including as described in the incorporated international patent application referenced above) can be used in the configuration of FIG. 9 in order to prevent unintended control devices 50 from being selected in response to current sneak paths in the system 30.

Figure 10:
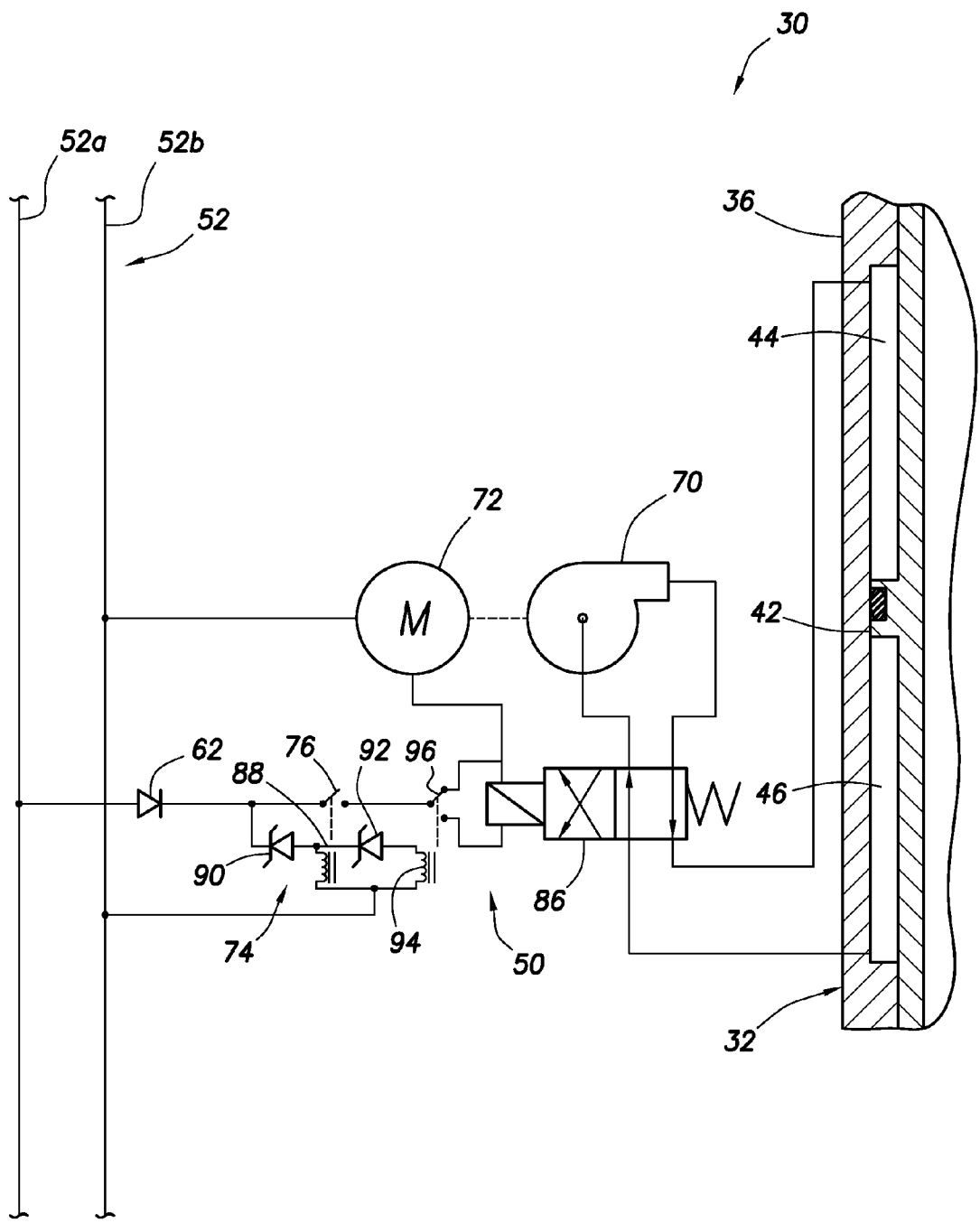
FIG. 10 is a schematic electrical diagram showing details of another configuration of the system and method, in which a voltage level across conductors is used to determine direction of actuation of the well tool.

Referring additionally now to FIG. 10, another configuration of the control device 50 in the system 30 is representatively illustrated. The control device 50 depicted in FIG. 10 can be substituted for any of the control devices 50a-f of FIG. 8.

In FIG. 10, the motor 72 only rotates when current flows through the directional element 62 (i.e., when the voltage potential is from the conductor 52a to the conductor 52b). This configuration of the system 30 also includes an under-voltage lockout device 74 which uses a zener diode 90 and a relay 88 including the switch 76 to prevent the control device 50 from being selected unless a predetermined minimum voltage exists across the lockout device (i.e., from the conductor 52a to the conductor 52b).

Thus, if the voltage exceeds the minimum level, the switch 76 will close and the motor 72 will drive the pump 70, thereby producing a pressure differential across the piston 42. Since, as depicted in FIG. 10, the output of the pump 70 is in communication with the upper chamber 44 and the input of the pump is in communication with the lower chamber 46, the piston 42 will be biased downwardly by the pressure differential.

However, if the voltage between the conductors 52a,b is sufficiently great (e.g., exceeds a predetermined threshold voltage, determined in this example by another zener diode 92), then another relay 94 will operate another switch 96, thereby actuating the shuttle valve 86. With the shuttle valve 86 actuated, the input of the pump 70 will be in communication with the upper chamber 44, the output of the pump will be in communication with the lower chamber 46, and the piston 42 will be biased upwardly by the pressure differential produced by the pump.

In this manner, the piston 42 can be displaced in opposite directions, depending upon the level of voltage applied across the conductors 52a,b. The voltage must exceed a predetermined minimum voltage in order to close the switch 76 and bias the piston 42 downwardly, and the voltage must exceed another greater predetermined threshold voltage in order to throw the switch 96 and actuate the shuttle valve 86 to bias the piston 42 upwardly. Of course, these directions could be reversed or in other orientations (e.g., laterally, rotationally, etc.), if desired.

Figure 11:
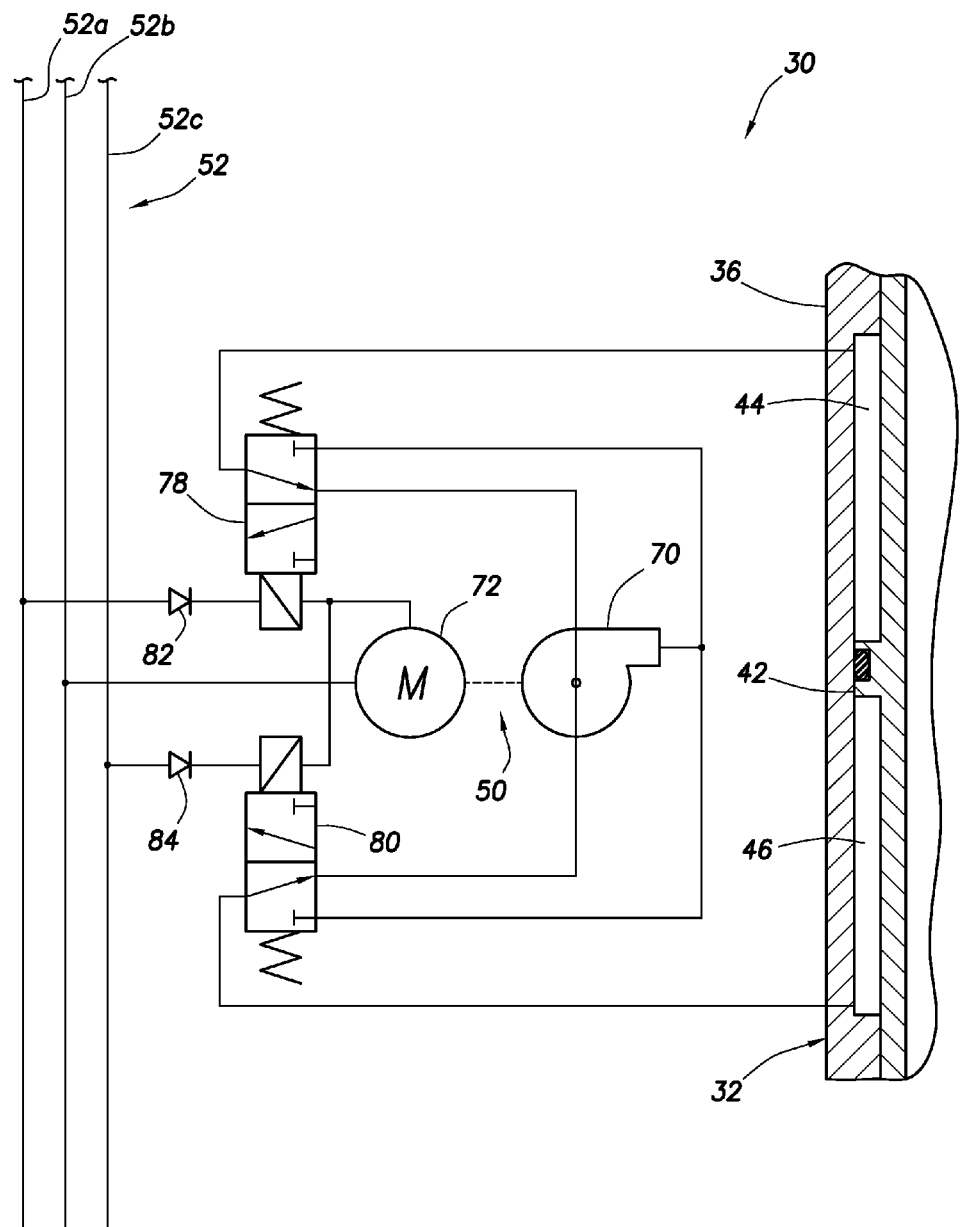
FIG. 11 is a schematic electrical diagram showing details of another configuration of the system and method, in which voltage across different pairs of conductors is used to determine direction of actuation of the well tool.

Referring additionally now to FIG. 11, another configuration of the system 30 and method are representatively illustrated. The configuration of FIG. 11 is similar in many respects to the configuration of FIG. 9. However, in the configuration of FIG. 11, the shuttle valves 78, 80 are actuated in response to a voltage being applied across respective sets of the conductors 52a-c.

When a voltage is applied across one set (52a,b) of the conductors 52, the shuttle valve 78 is actuated. When a voltage is applied across another set (52c,b) of the conductors 52, the other shuttle valve 80 is actuated. Thus, which one of the shuttle valves 78, 80 is actuated depends upon which set of conductors 52a,b or 52c,b the voltage is applied across. Diode 82 allows current flow in only one direction between the conductor 52a and the shuttle valve 78, and diode 84 allows current flow in only one direction between the conductor 52c and the shuttle valve 80.

As with the configuration of FIG. 9, if the shuttle valve 78 is actuated, the output of the pump 70 will be in communication with the upper chamber 44, and the input of the pump will be in communication with the lower chamber 46, and so a pressure differential generated by the pump will cause the piston 42 to be biased downwardly. If the shuttle valve 80 is actuated, the input of the pump 70 will be in communication with the upper chamber 44, and the output of the pump will be in communication with the lower chamber 46, and so a pressure differential generated by the pump will cause the piston 42 to be biased upwardly. The motor 72 preferably rotates in the same direction whether current flows through the diode 82 or through the diode 84.

Note that the under-voltage lockout device described above (including as described in the incorporated international patent application referenced above) can be used in the configuration of FIG. 11 in order to prevent unintended control devices 50 from being selected in response to current sneak paths in the system 30.

The motors 72 described above are preferably brushed DC motors, since they are reliable enough for this use and do not require complex controllers which would be exposed to the harsh downhole environment. However, brushless motors can be used, if desired.

The control devices 50 depicted in FIGS. 7-11 can be substituted for any of the control devices depicted in FIGS. 2-4. Any of the multiplexing techniques described above and in the incorporated international patent application referenced above can be used with the control devices 50 depicted in FIGS. 7-11.

It may now be fully appreciated that the above disclosure provides several advancements to the art of controlling multiple well tools downhole. For example, use of a downhole pump eliminates the need for installing hydraulic control lines in a well from a remote location to actuate the well tools 32. The configurations of the system 30 described above are reliable in operation and relatively simple in construction.

The above disclosure provides to the art a system 30 for selectively actuating from a remote location multiple downhole well tools 32 in a well. The system 30 includes multiple electrical conductors 52 in the well, and multiple control devices 50 that control which of the well tools 32 is selected for actuation in response to current flow in at least one set of the conductors 52. Each of the control devices 50 includes at least one downhole pump 70 which applies a pressure differential to an actuator 36 of a respective one of the well tools 32.

Each of the control devices 50 may include at least one valve 78, 80, 86 which provides selective fluid communication between the downhole pump 70 and the actuator 36 of the respective well tool 32. Fluid communication between the downhole pump 70 and the actuator 36 of the respective well tool 32 may be reversed by the valve 78, 80 in response to a voltage polarity across the set of conductors 52 being reversed.

An under-voltage lockout device 74 may prevent each of the control devices 50 from being selected until a voltage potential across the set of conductors 52 exceeds a predetermined minimum level.

The actuator 36 may be actuated in one direction when a voltage potential across the set of conductors 52 is less than a predetermined threshold level. The actuator 36 may be actuated in an opposite direction when the voltage potential across the set of conductors 52 exceeds the predetermined threshold level.

The downhole pump 70 may be reversible. The downhole pump 70 may apply the pressure differential to the actuator 36 when a voltage polarity is applied to the set of conductors 52, and the downhole pump 70 may apply an oppositely directed pressure differential to the actuator 36 when an opposite voltage polarity is applied to the set of conductors 52.

The actuator 36 may be actuated in one direction when voltage potential is applied across one set of conductors 52, and the actuator 36 may be actuated in an opposite direction when voltage potential is applied across another set of conductors 52.

Also described by the above disclosure is a method of selectively actuating from a remote location multiple downhole well tools 32 in a well, with the method including the steps of: selecting one of the well tools 32a for actuation by applying voltage potential across one set of conductors 52a,c in the well, thereby operating a downhole pump 72a connected to the well tool 32a; and selecting another one of the well tools 32b for actuation by applying voltage potential across another set of conductors 52b,c in the well, thereby operating another downhole pump 70b connected to the second well tool 32b.

An under-voltage lockout device 74a may prevent a control device 50a from being selected for actuation of the first well tool 32a until the voltage potential across the first set of conductors 52a,c exceeds a predetermined minimum level. A second under-voltage lockout device 74b may prevent another control device 50b from being selected for actuation of the second well tool 32b until the voltage potential across the second set of conductors 52b,c exceeds a predetermined minimum level.

An actuator 36 of the first well tool 32a may be actuated in one direction when the voltage potential across the first set of conductors 52a,c is less than a predetermined threshold level. The actuator 36 may be actuated in an opposite direction when the voltage potential across the first set of conductors 52a,c exceeds the predetermined threshold level.

A shuttle valve 86 of the first control device 50a may be interconnected between the first downhole pump 70a and the actuator 36. The shuttle valve 86 may be actuated in response to the voltage potential across the first set of conductors 52a,c exceeding the predetermined threshold level.

The step of selecting the first well tool 32a for actuation by applying the voltage potential across the first set of conductors 52a,c may include applying a voltage polarity across the first set of conductors 52a,c, thereby displacing a piston 42 of the first well tool 32a in one direction, and applying an opposite voltage polarity across the first set of conductors 52a,c, thereby displacing the piston in an opposite direction.

The above disclosure also describes a method of selectively actuating from a remote location multiple downhole well tools 32 in a well. The method includes the steps of: selecting a first one of the well tools 32a for actuation by applying a voltage polarity to a first set of conductors 52a,c in the well, thereby operating a first downhole pump 70a connected to the first well tool 32a and displacing a piston 42 of the first well tool 32a in one direction; and selecting the first well tool 32a for actuation by applying an opposite voltage polarity to the first set of conductors 52a,c, thereby operating the first downhole pump 70a and displacing the piston 42 of the first well tool 32a in an opposite direction.

The method may also include the steps of: selecting a second one of the well tools 32b for actuation by applying a voltage polarity to a second set of conductors 52b,c in the well, thereby operating a second downhole pump 70b connected to the second well tool 32b and displacing a piston 42 of the second well tool 32b in one direction; and selecting the second well tool 32b for actuation by applying an opposite voltage polarity to the second set of conductors 52b,c, thereby operating the second downhole pump 70b and displacing the piston 42 of the second well tool 32b in an opposite direction.

The step of selecting the first well tool 32a for actuation by applying the first voltage polarity to the first set of conductors 52a,c in the well may include actuating a first shuttle valve 78 interconnected between the first downhole pump 70a and the first well tool 32a, and the step of selecting the first well tool 32a for actuation by applying the second voltage polarity to the first set of conductors 52a,c may include actuating a second shuttle valve 80 interconnected between the first downhole pump 70a and the first well tool 32a.

An under-voltage lockout device 74a may prevent a first control device 50a from being selected for actuation of the first well tool 32*a* until the voltage potential across the first set of conductors 52*a,c* exceeds a predetermined minimum level.

The first downhole pump 70*a* may be reversible, whereby the first downhole pump 70*a* applies a pressure differential to the piston 42 when the voltage polarity is applied to the first set of conductors 52*a,c*, and the first downhole pump 70*a* applies an opposite pressure differential to the piston 42 when the opposite voltage polarity is applied to the first set of conductors 52*a,c*.

A motor 72*a* may drive the first downhole pump 70*a*. The motor 72*a* may rotate when the voltage polarity is applied to the first set of conductors 52*a,c*, and the motor 72*a* may oppositely rotate when the opposite voltage polarity is applied to the first set of conductors 52*a,c*. Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A system for selectively actuating from a remote location multiple downhole well tools in a well, the system comprising:
    multiple electrical conductors in the well, each well tool being connected to a different set of two electrical conductors extending to the remote location; and
    multiple control devices that control a direction of actuation of each well tool in response to a voltage potential applied across each respective set of conductors, each of the control devices including at least one downhole pump which applies a pressure differential to an actuator of a respective one of the well tools.

2. The system of claim 1, wherein each of the control devices includes at least one valve which provides selective fluid communication between the downhole pump and the actuator of the respective well tool.

3. The system of claim 2, wherein fluid communication between the downhole pump and the actuator of the respective well tool is reversed by the valve in response to a voltage polarity across the respective set of conductors being reversed.

4. The system of claim 1, wherein an under-voltage lockout device prevents each of the control devices from being selected until the voltage potential across the respective set of conductors exceeds a predetermined minimum level.

5. The system of claim 1, wherein the actuator is actuated in a first direction when the voltage potential across the respective set of conductors is less than a predetermined threshold level, and wherein the actuator is actuated in a second direction opposite to the first direction when the voltage potential across the respective set of conductors exceeds the predetermined threshold level.

6. The system of claim 1, wherein the downhole pump is reversible, whereby the downhole pump applies the pressure differential to the actuator when a first voltage polarity is applied to the respective set of conductors, and the downhole pump applies an oppositely directed pressure differential to the actuator when a second voltage polarity opposite to the first voltage polarity is applied to the respective set of conductors.

7. A system for selectively actuating a downhole well tool from a remote location, the system comprising:
    three electrical conductors extending between the well tool and the remote location; and
    first and second shuttle valves, the first shuttle valve being connected to the first and second conductors and the second shuttle valve being connected to the second and third conductors, wherein the well tool is actuated in a first direction when voltage potential is applied across the first and second conductors, and wherein the well tool is actuated in a second direction opposite to the first direction when voltage potential is applied across the second and third conductors.

8. A method of selectively actuating from a remote location multiple downhole well tools in a well, the method comprising the steps of:
    selecting a first one of the well tools for actuation by applying voltage potential across a first set of conductors in the well, thereby operating a first downhole pump connected to the first well tool; and
    selecting a second one of the well tools for actuation by applying voltage potential across a second set of conductors in the well, thereby operating a second downhole pump connected to the second well tool, wherein the first set of conductors and the second set of conductors share a conductor.

9. The method of claim 8, wherein a first under-voltage lockout device prevents a first control device from being selected for actuation of the first well tool until the voltage potential across the first set of conductors exceeds a first predetermined minimum level.

10. The method of claim 9, wherein a second under-voltage lockout device prevents a second control device from being selected for actuation of the second well tool until the voltage potential across the second set of conductors exceeds a second predetermined minimum level.

11. The method of claim 9, wherein an actuator of the first well tool is actuated in a first direction when the voltage potential across the first set of conductors is less than a predetermined threshold level, and wherein the actuator is actuated in a second direction opposite to the first direction when the voltage potential across the first set of conductors exceeds the predetermined threshold level.

12. The method of claim 11, wherein a shuttle valve of the first control device is interconnected between the first downhole pump and the actuator, and wherein the shuttle valve is actuated in response to the voltage potential across the first set of conductors exceeding the predetermined threshold level.

13. The method of claim 8, wherein the step of selecting the first well tool for actuation by applying the voltage potential across the first set of conductors further comprises applying a first voltage polarity across the first set of conductors, thereby displacing a piston of the first well tool in a first direction, and applying a second voltage polarity opposite to the first voltage polarity across the first set of conductors, thereby displacing the piston in a second direction opposite to the first direction.

14. A method of selectively actuating from a remote location multiple downhole well tools in a well, the method comprising the steps of:
    selecting a first one of the well tools for actuation by applying a first voltage polarity to a first set of conductors in the well, thereby operating a first downhole pump connected to the first well tool and displacing a piston of the first well tool in a first direction; and
    selecting the first well tool for actuation by applying a second voltage polarity opposite to the first voltage polarity to the first set of conductors, thereby operating the first downhole pump and displacing the piston of the first well tool in a second direction opposite to the first direction.

15. The method of claim 14, further comprising the steps of:
selecting a second one of the well tools for actuation by applying a third voltage polarity to a second set of conductors in the well, thereby operating a second downhole pump connected to the second well tool and displacing a piston of the second well tool in a third direction; and
selecting the second well tool for actuation by applying a fourth voltage polarity opposite to the third voltage polarity to the second set of conductors, thereby operating the second downhole pump and displacing the piston of the second well tool in a fourth direction opposite to the third direction.

16. The method of claim 14, wherein the step of selecting the first well tool for actuation by applying the first voltage polarity to the first set of conductors in the well further comprises actuating a first shuttle valve interconnected between the first downhole pump and the first well tool, and wherein the step of selecting the first well tool for actuation by applying the second voltage polarity to the first set of conductors further comprises actuating a second shuttle valve interconnected between the first downhole pump and the first well tool.

17. The method of claim 14, wherein a first under-voltage lockout device prevents a first control device from being selected for actuation of the first well tool until the voltage potential across the first set of conductors exceeds a first predetermined minimum level.

18. The method of claim 14, wherein the first downhole pump is reversible, whereby the first downhole pump applies a pressure differential to the piston when the first voltage polarity is applied to the first set of conductors, and the first downhole pump applies an opposite pressure differential to the piston when the second voltage polarity is applied to the first set of conductors.

19. The method of claim 14, wherein a motor drives the first downhole pump, and wherein the motor rotates when the first voltage polarity is applied to the first set of conductors, and the motor oppositely rotates when the second voltage polarity is applied to the first set of conductors.

* * * * *